Nov. 26, 1946.   R. LESNICK   2,411,608
SPLIT-PHASE MOTOR FOLLOW-UP SYSTEM
Filed May 1, 1943
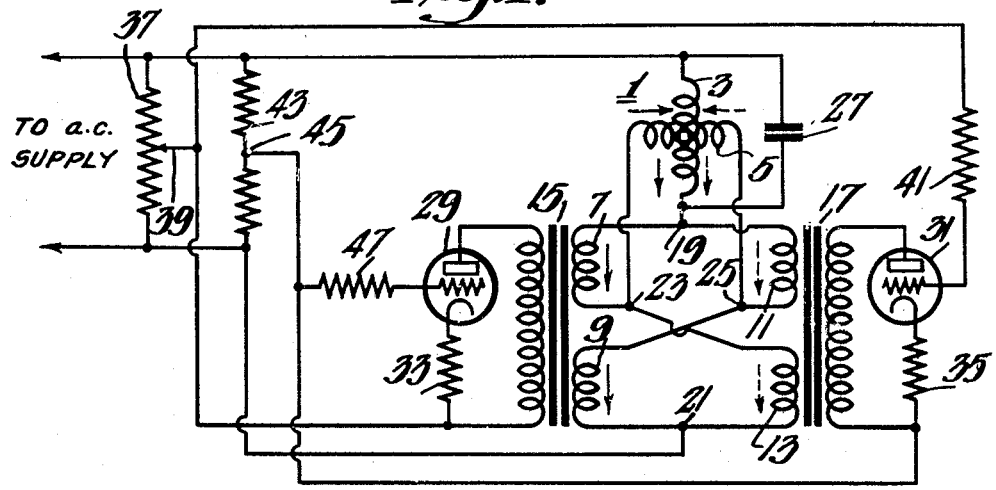
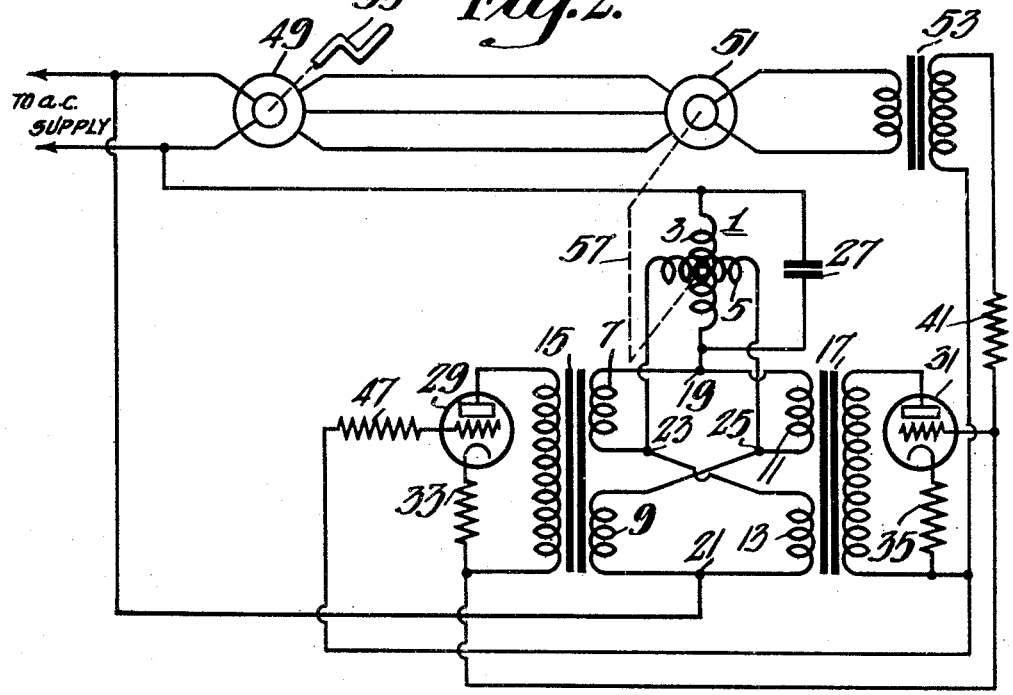
Inventor
Robert Lesnick
By
CD Tuska
Attorney Patented Nov. 26, 1946

2,411,608

UNITED STATES PATENT OFFICE 2,411,608

SPLIT-PHASE MOTOR FOLLOW-UP SYSTEM

Robert Lesnick, Camden, N. J., assignor to Radio Corporation of America, a corporation of Delaware Application May 1, 1943, Serial No. 485,301

3 Claims. (Cl. 172—239)

1

This invention relates to the control of electric motors and more particularly to systems for controlling the speed and/or angular displacement of the rotor of an alternating current motor in response to variations in the position of a mechanical input device.

Accurate control of the speed or angular displacement of an electric motor is desirable in many applications; for example, the control of guns, searchlights, directive radio antennas and the like. In displacement control systems it is usually desirable to control the relatively large mechanical power output of a motor in response to a relatively small input such as may be conveniently produced by a manually operable crank or an indicator. Direct current motors are particularly adapted to such applications as require wide variation of motor speed and motor torque. However, alternating current motors are less expensive and alternating current energy is usually more readily available than direct current. Thus, for reasons of economy, it is frequently desirable to employ an A.-C. motor, although the required control circuits may be more complex than those which would be required for a D.-C. motor.

It is the principal object of this invention to provide an improved method of and means for controlling the speed of a two phase induction motor.

Another object is to provide an improved electrical follow-up system.

These and other objects will become apparent to those skilled in the art upon consideration of the following description with reference to the accompanying drawing, of which:

Figure 1 is a schematic circuit diagram of a system for controlling the energization of an alternating current motor, and Figure 2 is a schematic circuit diagram of an electrical follow-up system embodying the instant invention.

Referring to Figure 1, a two phase induction motor 1 is provided with phase windings 3 and 5. The phase windings are connected through the secondary windings 7, 9, 11 and 13 of a pair of transformers 15 and 17 to an A.-C. supply, not shown. The secondary windings 7, 9, 11 and 13 are connected in a Wheatstone bridge circuit having conjugate pairs of terminals 19, 21, 23 and 25. The motor winding 3 is connected to the A.-C. supply through the bridge by way of the terminals 19 and 21. The motor winding 5 is connected across the bridge at the points 23 and 25. A capacitor 27 is connected across the motor winding 3.

2

Electron discharge tubes 29 and 31 are provided with their anode-to-cathode circuits connected across the primaries of the transformers 15 and 17 respectively. Resistors 33 and 35 are provided in the cathode circuits of the tubes 29 and 31. A voltage divider 37 is connected across the A.-C. supply and is provided with a variable tap 39 which is connected to the cathode circuit of the tube 29 and through a resistor 41 to the control grid of the tube 31. A second voltage divider 43 is connected across the A.-C. supply and is provided with a fixed tap 45 which is connected to the cathode circuit of the tube 31 and through a resistor 47 to the control grid of the tube 29.

The operation of the above described system is as follows:

The A.-C. supply voltage causes currents to flow through the motor windings 3 and 5, the windings 7 and 9 of the transformer 15, as indicated by the solid arrows, and the windings 11 and 13 of the transformer 17, as indicated by the dash arrows. The impedances presented to the flow of current by the windings 7 and 9 and 11 and 13 are functions of the conductivities of the tubes 29 and 31 respectively. When the tube 29 is conductive and the tube 31 is cut off, current flows through the paths indicated by the solid arrows, causing the motor 1 to rotate in one direction. When the tube 31 is conductive and the tube 29 is cut off, current flows through the paths indicated by the dotted arrows, reversing the polarity of the winding 5 and causing the motor to run in the opposite direction. The magnitude of the currents through the motor windings depends upon the impedances presented by the secondary windings 7 and 9 or 11 and 13.

The variation in these impedances may be effected in either of two ways: If the transformers 15 and 17 are designed so as to saturate as a result of the plate currents of the tubes 29 and 31, the inductances of these secondary windings are varied according to the conductivities of the tubes. If the transformers 15 and 17 are designed so as not to saturate, the dynamic plate resistances of the tubes 29 and 31 are reflected in the secondaries providing corresponding variations in secondary impedance. It will be apparent that both of these effects may be employed together, if desired, by proper design of the transformers 15 and 17. In any event, the magnitude as well as the directions of the currents through the windings of the motor 1 are controlled by variations in the conductivities of the tubes 29 and 31, thus providing control of the speed as well as the direction of rotation of the motor. The conductivities of the tubes 29 and 31 are controlled by variations in the amplitude of A.-C. voltages applied to the control grids from the voltage divider 37. The resistors 33 and 35 provide automatic bias and may be adjusted so that both tubes are substantially non-conductive when the variable tap 39 is in its mid position.

When the tap 39 is moved away from its mid position, for example toward the upper end of the voltage divider 37, the control grid of the tube 31 is provided with an A.-C. voltage which is in phase with the A.-C. plate voltage induced in the primary of the transformer 17. At the same time an equal voltage of opposite polarity is applied to the control grid of the tube 29. The impedances presented by the secondary windings 11 and 13 are lower than those presented by the secondaries 7 and 9, causing current to flow through the motor 1, as indicated by the dash arrows. The magnitude of this current depends upon the distance the tap 39 is moved away from the center of the voltage divider 37. Similarly the motor may be energized to rotate in the opposite direction by moving the tap 39 toward the lower end of the voltage divider 37. Thus the relatively small amount of energy required to operate the voltage divider 37 will control the relatively large mechanical energy supplied by the motor, both as to magnitude and direction.

Figure 2 shows a follow-up system incorporating the motor control circuit of Figure 1. Similar parts of the circuits of Figures 1 and 2 are designated by corresponding reference numerals. A pair of synchro devices 49 and 51 are connected in cascade between the A.-C. supply and a transformer 53. The secondary of the transformer 53 is connected between the control grids and the cathodes of the tubes 29 and 31. The rotor of the synchro transformer 49 is coupled to a source of mechanical input, such as a manually operable crank 55. The rotor of the synchro device 51 is mechanically connected, as indicated by the line 57, to the rotor of the induction motor 1.

Voltage from the A.-C. supply is transmitted through the synchro devices 49 and 51 to the transformer 53. The amplitude of the voltage across the primary of the transformer 53 and its polarity with respect to the polarity of the supply voltage depends upon the relative positions of the rotors of the synchro devices 49 and 51. The voltage induced in the secondary of the transformer 53 controls the tubes 29 and 31, causing the motor to rotate in one direction or the other depending upon the relative positions of the rotors of the transformers 49 and 51. Rotation of the motor drives the rotor of the synchro device 51 toward an angular position corresponding to that of the synchro device 49. When the rotors of the synchro devices 49 and 51 are in positional agreement, the tubes 29 and 31 are equally conductive and the motor stops. If the crank 55 is rotated to a new position the motor 1 will follow, driving the rotor of the synchro device 51 and any mechanical load which may be connected thereto.

Thus the invention has been described as an improved control system for a two phase induction motor employing electron discharge tubes as variable impedance elements coupled to one of the motor windings through a Wheatstone bridge circuit and to the other of the motor windings as a series impedance element. A typical application of this circuit in a follow-up system is described employing conventional synchro devices for deriving the displacement control signals.

I claim as my invention:

1. A control system including a motor including two phase windings, a pair of electron discharge tubes, two transformers each provided with a primary winding connected between the anode and cathode of one of said electron discharge tubes and each provided with two secondary windings, all of said secondary windings being interconnected to form a Wheatstone bridge circuit, means for applying A.-C. voltage to one of the phase windings of said motor through one pair of conjugate terminals of said bridge circuit and applying said voltage to the other of the phase windings of said motor through another pair of conjugate terminals of said bridge circuit whereby A.-C. voltages are presented between the anode and cathode of each of said electron discharge tubes, and means for applying oppositely variable A.-C. voltages between the control grids and cathodes of said electron discharge tubes.

2. A control system including a motor provided with two power input windings, a pair of electron discharge tubes, two transformers each provided with a primary winding connected between the anode and cathode of one of said discharge tubes and each provided with two secondary windings, all of said secondary windings being connected together to form a Wheatstone bridge circuit, means for applying A.-C. voltage to one of the power input windings of said motor through one pair of conjugate terminals of said bridge circuit, means for applying said A.-C. voltage to the other power input winding of said motor through another pair of conjugate terminals of said bridge circuit, and means for applying a variable A.-C. control voltage in opposite polarities to the control grids of said electron discharge tubes.

3. An electrical follow-up system including an output shaft which is to be driven to a predetermined angular position, means for producing an A.-C. control voltage having magnitude and polarity related in a predetermined manner to the difference between said predetermined angular position and the actual position of said output shaft, a motor provided with two power input windings and coupled to said output shaft, two electron discharge tubes connected respectively to a pair of transformers, each of said transformers being provided with two secondary windings, all of said secondary windings being connected together to form a Wheatstone bridge circuit, means for applying A.-C. voltage to one of the power input windings of said motor through one pair of conjugate terminals of said bridge circuit and to the other power input winding of said motor through another pair of conjugate terminals of said bridge circuit, and means for applying said A.-C. control voltage to the control grids of said electron discharge tubes in opposite polarities.

ROBERT LESNICK.